United States Patent [19]

Geel

[11] Patent Number: 4,818,583

[45] Date of Patent: Apr. 4, 1989

[54] USE OF A FIBROUS WEB INCORPORATING MICROSPHERES FOR PREPARING REINFORCED OBJECTS

[75] Inventor: Adam P. Geel, Doorwerth, Netherlands

[73] Assignee: Lantor B.V., Veenendaal, Netherlands

[21] Appl. No.: 823,534

[22] Filed: Jan. 29, 1986

[30] Foreign Application Priority Data

Jan. 29, 1985 [NL] Netherlands .......................... 8500242

[51] Int. Cl.$^4$ ................................................ B32B 3/00
[52] U.S. Cl. ..................................... 428/195; 428/206; 428/210; 428/218; 428/283; 428/290; 428/300; 428/315.5; 428/323; 428/327; 428/402; 428/407; 428/408; 428/902
[58] Field of Search ............... 428/290, 402, 283, 327, 428/407, 406, 300, 195, 206, 210, 218, 313.3, 313.5, 323, 327, 408, 902

[56] References Cited

U.S. PATENT DOCUMENTS

| | | | |
|---|---|---|---|
| 3,050,427 | 4/1957 | Slayter et al. | 156/26 |
| 3,676,288 | 5/1970 | Hoyle | 161/158 |
| 4,327,142 | 4/1982 | Norzi | 428/313.5 |
| 4,481,241 | 11/1984 | Kawashima et al. | 428/283 |
| 4,568,603 | 2/1986 | Oldham | 428/195 |
| 4,568,608 | 2/1986 | Kawabara et al. | 428/402 |
| 4,671,994 | 6/1987 | Cochran | 428/402 |

FOREIGN PATENT DOCUMENTS

| | | |
|---|---|---|
| 1427647 | 3/1976 | |
| 0041054 | 12/1981 | European Pat. Off. |
| 2395141 | 2/1979 | France |

*Primary Examiner*—James J. Bell
*Attorney, Agent, or Firm*—Cushman, Darby & Cushman

[57] ABSTRACT

The use of a fibrous web provided with microspheres disposed mainly within said web and arranged in a pattern in which areas of the web which contain microspheres and separated from each other by areas which contain virtually no microspheres, for making an article of manufacture reinforced with fibrous webbing by impregnating the web with a liquid resin and a hardener therefor.

A shaped article of manufacture comprising a bonded fibrous web as described hereinabove, provided with expanded microspheres, said fibrous web having been impregnated with a mixture of a liquid resin and a hardener therefor, cured after being shaped, as well as a method of making a fibrous web incorporating microspheres, which is characterized in that microspheres not yet expanded are pressed into the fibrous web by means of a foam paste.

14 Claims, No Drawings

USE OF A FIBROUS WEB INCORPORATING MICROSPHERES FOR PREPARING REINFORCED OBJECTS

FIELD OF THE INVENTION

The invention relates to the use of a fibrous web incorporating microspheres, for the preparation of objects reinforced with such a fibrous web, by impregnating the web with liquid resin and a hardener therefor, to reinforced articles of manufacture containing a fibrous web incorporating microspheres, as well as to a method of preparing fibrous webs incorporating microspheres.

BACKGROUND OF THE INVENTION

UK Patent Specification No. 1,427,647 and U.S. Pat. No. 3,676,288 describe the application to, or incorporation in, a fibrous web of non-expanded microspheres by means of a binder, for example, a polyacrylonitrile latex. As the binder is dried and crosslinked, the spheres are attached to the fibrous web and expanded.

Such webs are extremely suitable as a reinforcement for all kinds of cured synthetic plastics materials, such as polyester resin or epoxy resin. In fact, the advantage in using the expanded microspheres in combination with the fibrous web is that the incorporation of the extremely light spheres in the resin is considerably simplified. The use of the microspheres results in a considerable saving of resin and glass fiber, and the mechanical properties of the product reinforced with the web are at least maintained. Rigidity and impact resistance are even improved, and the thermal insulation capacity is enhanced too.

In the practice of this method, it was found that the displacement of the air in the fibrous web by the liquid resin can be accelerated by perforating the carrier material with holes of approximately 1.5 mm spaced short distances apart, for example 5-15 mm. It has been found, that the impregnation is sensitive to changes in procedure. If, for example, one waits longer, it may occur that certain parts of the web come to float, as a result of which the resin sinks back into the perforations and an air bubble or air passages can be formed at these locations. This means that upon completion a potential local weakening may be formed.

SUMMARY AND OBJECTS OF THE PRESENT INVENTION

The first object of the present invention is to provide a specific fibrous web with microspheres dispersed therein for making an article of manufacture reinforced with fibrous webbing, by impregnating the web with liquid resin and a hardener therefor.

This object is obtained by preparing and using a fibrous web provided with microspheres disposed mainly within said web and arranged in a pattern in which areas of the web which contain microspheres are separated from each other by areas which contain virtually no microspheres, and providing (making) an article of manufacture reinforced with fibrous webbing by impregnating the web with a liquid resin and a hardener therefor.

The second object of the invention is to provide a shaped article of manufacture comprising a bonded fibrous web expanded with microspheres the fibrous web being impregnated with a mixture of a liquid resin and a hardener therefor, cured after being shaped.

This object is reached by obtained by providing and using a web, wherein the microspheres are mainly contained within the web and arranged in a pattern in which areas of the web which contain microspheres are separated from each other by areas which contain virtually no microspheres.

DETAILED DESCRIPTION OF THE PRESENT INVENTION

The present invention provides a shaped article of manufacture comprising a bonded fibrous web provided with expanded microspheres therein wherein the fibrous web has been impregnated with a mixture of a liquid resin and hardener therefor (catalyst), has been shaped, and thereafter cured. The microspheres in the shaped article of manufacture are mainly contained within the web itself and the microspheres are arranged in a pattern in the web such that sections of the web containing microspheres are separated apart from each other by web areas which contain virtually (substantially) no microspheres.

The aforedescribed shaped article of manufacture comprising a bonded fibrous web provided with expanded microspheres is obtained by selectively pressing, i.e., impregnating, a foam paste cntaining the unexpanded microspheres into the fibrous web. In the method, one means for pressing or impregnating the foam paste into the fibrous web is using a screen printing apparatus. With respect to the paste, the foam paste is preferably a stable foam paste. After the web has been impregnated with the foam paste, the microspheres are thereafter expanded. When the web has also been provided with a liquid resin and hardener and the resin and hardener have been cured, a reinforced article of manufacture is obtained.

Preferably the microspheres are arranged in a regular pattern, for example as "islands" that are substantially similar in shape and are separated from each other by areas (channels) containing no microspheres, but only fibers.

In this respect it is remarked, that throughout the application, the words "containing microspheres" are to be understood as indicating an amount of microspheres of at least 10 vol.%, whereas "virtually no microspheres" denotes an amount of at most 5 vol.%.

Surprisingly it has been found, that such a use of a web leads to a manifestly better flexural strength and other mechanical properties of the reinforced product.

Furthermore, it has been found, that the impregnation of the web proceeds smoother and better than with the known webs, which are fully provided with microspheres. This is for example embodied in the fact that no perforations are necessary, or that less or smaller perforations suffice.

An important advantage for the practice of the impregnation is that the progress of the saturation of the web with resin has become visible. Especially when a fiber is used with the same refractive index as the resin (for example polyacrylonitrile fiber-polyester resin), this can be an important advantage.

The area of the web printed with microspheres amounts in general at least to 75%, preferably 80 to 95%.

After expanding the microspheres, the amount thereof in the web is in general 10 to 60 vol.%. This amount depends on the amount of microspheres used and the degree of expansion thereof.

Suitable fibrous webs for use in accordance with the present invention are the conventional, optionally reinforced, non-woven fibrous webs. Their manufacture is known per se, for example, from the book by Dr. H. Jörder, Textilien auf Vliesbasis (D. V. R. Fachbuch, P. Kepper Verlag). Suitable fibers for the web are metal fibers, ceramic fibers, mineral fibers, glass fibers, carbon fibers, or fibers of synthetic plastic materials.

It is also possible to use a combination of a non-woven fibrous web with a reinforcing fabric, one within or on top of the other.

Binders suitable for use in the present invention are lower alkyl acrylate polymer, styrene-butadiene rubber, acrylonitrile polymer, polyurethane, epoxy resins, polyvinyl chloride, polyvinylidene chloride, and copolymers of vinylidene chloride with other monomers, polyvinyl acetate, partially hydrolyzed polyvinyl acetate, polyvinyl alcohol, polyvinyl pyrrolidone, polyester resins and the like. Optionally these binders can be provided with acidic groups, for example by carboxylating the binders. A suitable carboxylating agent is, for example, maleic anhydride. In addition the binder composition contains optionally water, surfactants, foam stabilizers, fillers and or thickeners.

Although, in the context of the present invention, one would not readily resort to the use of fillers in addition to the microspheres, it is possible to use colors, active components, such as carbon black, hydrated alumina, blown silica, and the like.

The microspheres to be used preferably consist of a thermoplastic synthetic resin material that is solid at room temperature.

In the spheres, a chemical or physical blowing agent has been incorporated. The various components, binder, synthetic resin and blowing agent are preferably so attuned to each other that during the drying of the impregnated fibrous web on the one hand the binder is hardened and cross-linked, and on the other hand at the same temperature the sphere is expanded.

The spheres may consist of, possibly filled, synthetic resins, such as polystyrene, styrene copolymers, polyvinyl chloride, vinyl chloride copolymers, vinylidene chloride copolymers and the like.

The blowing agent may be a chemical or physical blowing agent, such as azodicarbonamide, isobutane, Freon, and the like.

The spheres advantageously have a diameter of 4–20 $\mu$m in the unexpanded state. After expansion the diameter is preferably 10–100 $\mu$m.

The fibrous web produced in accordance with this invention is, in particular, very suitable for use as a core material for objects made of all kinds of synthetic resins, such as polyester resin or epoxy resin.

The fibrous web to be used in the invention can be prepared in a number of ways by the use of a printing method, in which method a crosslinkable carrier material in the form of a paste-like physical condition containing microspheres is brought into the fibrous web.

One aspect of the prior art core material is the phenomenon that the microspheres readily become detached from the surface of the web when the latter is manipulated. On the one hand this is a result of the way of impregnation, which is has hitherto been impossible to improve, and on the other hand of the limited content of binder latex required for the strength of the product formed in the process wherein the kind of microspheres used also plays a role. If only a very low proportion of the microspheres become detached, their fineness accounts for dusting in the workshop, which may be quite a nuisance from time to time. This problem can be met by the use of a specific kind of microspheres. This restricts however the freedom of choice.

When, during manufacture, the fibrous web has passed the impregnation trough, and subsequently has been pressed between two Foulard rolls, this results in a fractionally non-uniformly and locally varying coverage with binder composition of the surface of the web as it leaves the nip. This local variation has a meandering effect, which, it is true, is hardly noticeable as the web leaves the nip, but is much more clearly manifest when the microspheres have later expanded from heating. After expansion, these local extra depositions of microspheres give the web surface a clearly irregular aspect, with fiber coverage and hence integrity being diminished at the "tops".

It is a further object of the present invention to accomplish such an improvement in the incorporation of the expanded microspheres in the web that these disadvantages are overcome.

This object is obtained by pressing the still unexpanded microspheres into the fibrous web by means of a paste.

It has surprisingly been found that a fibrous web made in this manner does not exhibit any of the limitations of the known fibrous webs.

An important point with regard to this invention is that a preferably dimensionally stable foamed binder paste containing the microspheres, then not as yet expanded, can be deposited in the web in a controlled manner, whereby any mass is no longer on top of the surface.

This feature has proved to be sufficient to avoid dusting altogether. This is independent of the kind of microspheres used.

The present invention provides an additional advantage. The present invention provides much more consistent reproducibility of results, i.e. product.

Pressing the spheres into the fibrous web by means of a foam paste can be effected in various ways.

Preferably, however, a screen printing technique is used, in particular a dimensionally stable foam paste in the screen printing technique employed.

Fiber-containing passages can be obtained in the material after expansion of the microspheres. Fiber-containing passages can be obtained by using a stencil having a suitable pattern. Sufficient fiber-containing passages can be obtained whereby satisfactory deaeration in the incorporation of liquid resin. Moreover, the patterning of the places with a freer resin supply can be made such as to give a further contribution to the bending stiffness of the resin product to be formed with it.

Surprisingly it has in addition been found that, on a microscale, within the web with expanded spheres, a further improvement has materialized in the uniformity of the spatial distribution of these spheres, which also turns out to contribute favorably to the strength of the resin product to be formed.

In addition it has been found that the impregnation of the web thus obtained with a polyester or epoxy resin is considerably better reproducible. In the state of the art, the reproducibility of the flexural modulus is approximately 25%, whereas according to the present invention this value is about 5%.

An important feature in the method for preparing the fibrous web according to this invention is that the microspheres can be introduced into the web by means of a foam paste. This foam paste consists mainly of the binder for the spheres and the fibrous web.

A preferred foam paste is stable to such an extent, that the usual shear forces acting on the foam during and after printing do not cause substantial destruction of the foam. Generally speaking, at least 85-90% of the foam cells is maintained.

It is also possible, however, for the foam printing method according to the invention to be carried out with unstable, or less stable foam. This does not, then, result in the advantages of using stable foam, although some of the advantages of this invention are maintained. The composition of the dimensionally stable foam does not constitute any novel particular aspects: the high foam stability can be achieved by using measures well known in the art. Thus, in addition to a suitable surfactant, a high viscosity can be provided, foam stabilizers may be added, or substances preventing desiccation, low-molecular emulsifiers may be used, and a high dry content ensured. The dry content is preferably at least 20%. The higher the content of dry matter, the faster the binder will coagulate upon forced drying, as a result of which the foam structure is maintained.

Of importance to a dimensionally stable foam, in addition to its composition, is its physical fineness. An important point to ensure stability during printing is that the average diameter of the foam bubbles should be less than half the average fiber interspace in the web. The suitability of the foam for the printing process on the rotary-screen machine can be evaluated in various ways. Thus, for example, use can be made of a high-speed laboratory mixer to beat foam to a certain fineness to be expressed in its density in g/l. The higher the density, the finer the foam bubbles are. The conventional values range between 50 and 300 g/l. Of this foam, a volume of 1 l can be separated in a graduated cylinder and allowed to stand in an environmental chamber at 20° C. for 24 hours. Evaluation is then effected by measuring the amount of liquid settled. A foam suitable for use in the dimensionally stable foam paste will exhibit no settled liquid after 24 hours.

Suitable surfactants are of the anionic or non-ionic type, such as soaps, alkyl-aryl sulphonates, fatty alcohol sulphates, ethoxylated fatty acid compounds, and the like.

Foam stabilizers suitable for use in the present invention comprise the following compounds: fatty acid amide condensates, ammonium and potassium stearate, cyclohexanol alkyl amino salts of acetic acid, formic acid and propionic acid, tertiary amino oxide and the like. The binders, optional fillers, microspheres, and fibrous webs are in principle described hereinabove in relation to the use of the webs and to the reinforced articles.

The process according to the invention can be carried into effect by means of a screen printing machine. Such a machine is known per se, for example, from European patent application No. 47559, which has been laid open to public inspection.

An important point in the choice of the specific machine and the adjustment thereof is that the foam is introduced into the fibrous web. The amount that may be present on or at the surface is a very small one only, because otherwise, specifically, the dusting of spheres is not suppressed.

As indicated above, the foam can be introduced into the fibrous web in a pattern. In addition it is possible to apply the foam throughout the entire surface.

The pattern chosen depends fully on circumstances and specific requirements which the final product should satisfy. In addition it is possible to apply a certain decorative pattern. Such a pattern need not specifically contribute to the mechanical properties of the final product.

It is also possible for the web to be printed from both sides, with the same pattern being applied twice at the same location. This may be of advantage in the case of thick webs. It is also possible to apply different patterns, for example, a mirror-image pattern, with foam being introduced on one side where it is not at the other side, and the other way round.

A suitable pattern which also contributes to the strength of a reinforced synthetic resin sheet to be made with the impregnated fibrous web is a honeycomb structure.

EXAMPLE 1

A 2.5 mm thick white needled web of 130 g/m² consisting of 85% by weight of 5.0 dtex/50 mm polyester fiber and 15% by weight of 7.0 dtex melting fibers with a softening temperature of 130°-150° C., which swells or dissolves in polar or aromatic solvents, is fixed in a furnace at 160°-180° C.

Subsequently the web is printed on a rotary screen machine with a hexagonally formed pattern with an open area of 80% of the basic stencil. During this process, 220 g/m² of a dimensionally stable foam composition is applied, the composition of which is given in Table A, with a 35% dry content on the basis of a latex of a hard polyester resin, with 40% of the dry content consisting of microspheres and a foam density of 100 kg/m³. In this printed fixed needled web, the microspheres are subsequently expanded by means of steam and subsequently dried and cured at 130° C.

The resulting product is suitable for use as a core material in the reinforced synthetic resin sector.

TABLE A

| | Parts by weight in the mixture | |
|---|---|---|
| | wet (parts) | dry (%) |
| hard polyester polymer dispersion | 850 | 25.6 |
| microspheres on the basis of PVDC-Copol | 500 | 38.5 |
| humidifier on the basis of polyaminoamide | 150 | 4.2 |
| Hexa Methylol Melamine | 136 | 15.3 |
| catalyst | 25 | 2.8 |
| acetic acid salt of fatty amine complex | 19 | 2.1 |
| polyphosphate thickening agent | 500 | 11.5 |
| water | 600 | |

EXAMPLE 2

The resulting improvement in bending stiffness by the use of the fibrous web according to the present invention in fiber-reinforced polyester, as compared with known fibrous webs, can be elucidated in the light of a comparison of laminate properties. The starting product is the same basic web, which is provided with the expandable binder in two ways, namely, the known method in which, by saturation binding by foulardizing, a viscous expandable binder with a dry content of 16% is applied, and the method according to the present invention, in which an expandable binder with a dry content of 45% is applied in a pattern by means of stable-foam printing. The basic fleece is a 100% polyester randowebber fleece, consisting of 20% by weight of 4.7 dtex/35 mm and 80% by weight of 1.7 dtex/60 mm fiber and bonded to a fiber:binder ratio by weight of 80–20 with a thermoplastic methylmethacrylate binder. Part of the resulting basic fleece, which weighs 100 g/m² and is 1.6 mm thick, is post-bonded by the old method using the expandable binder on the basis of polyacrylic acid as specified in Table B below by means of foulardizing and with a squeeze effect of 280%, with the result that, after drying, 40 g/m² of the microspheres is set. Another part is treated in accordance with the present invention using a rotary-screen foam printing machine with a stencil with a honeycomb structure, the ribs of which are 4 mm long, and with the expanded area being 90% of the total area. The depth of penetration of the stable foam, with a dry content of 45% and a foam density of 100 kg/m³ in the web is 1.4 mm; the area actually printed is now 80%. The result is that, after drying, 40 g/m² of the microspheres is set. Both expanded webs are 4.2 mm thick, measured under a pressure of 40 g/cm², and have a foam volume of 2.2 l/m². Both webs are formed into laminates having the following structure:

1×300 g/m² glass mat
1×450 g/m² glass mat
1×4 mm of the above expanded webs
1×450 g/m² glass mat
1×300 g/m² glass mat.

These mats are successively superimposed, and impregnated with polyester resin. Total resin consumption is 6030 g/m². The total thickness of the laminate is 7.6 mm; its weight per m² is 7670 g and it has an S value of 0.55 (S=thickness expanded web/thickness laminate).

By means of the 3 point bending test according to DIN 53457 the $E_{mod}$ is determined with a ratio of slenderness $\lambda$ ($\lambda$=length between support points/total thickness) of 10 and 30.

It has now been found that, as compared with a 35 weight% glass-reinforced solid polyester panel ("full-laminate") with an $E_{mod}$ of 8400 N/mm². the sandwich laminates with an S value of 0.55, made in accordance with the state of the art, at $\lambda$=30 have an $E_B$ of 6600 N/mm² and at $\lambda$=10 an $E_B$ of 5650 N/mm². If it is desired to have the same bending strength as that of the full-laminate the sandwich laminate must be 8% and 14% respectively, thicker than of the full-laminate.

When the above new core material is used, the moduli found are 8400 N/mm² at $\lambda$=30 and 7900 N/mm² at $\lambda$=10. This differs so little from the $E_{mod}$ of the full-laminate that oversizing is hardly necessary, but the resin saving is 2 l/m².

TABLE B

| | parts by weight | |
|---|---|---|
| | wet (parts) | dry (%) |
| Binder on the basis of polyacrylic acid for saturation impregnation. | | |
| polyacrylic acid dispersion | 27.5 | 2.1 |
| microspheres on the basis of PVDC-Copol | 500 | 90.1 |
| 2-amino-2-hydroxy-methylpropane | 5 | 1.2 |
| humidifier on the basis of polyaminoamide | 103 | 6.6 |
| water | 1800 | |
| Stable foam binder on the basis of a polyacrylic acid | | |
| polyacrylic acid | 45 | 2.7 |

TABLE B-continued

| | parts by weight | |
|---|---|---|
| | wet (parts) | dry (%) |
| dispersion | | |
| microspheres on the basis of PVDC-Copol | 600 | 82.7 |
| 2-amino-2-hydroxy-methylpropane | 8 | 1.5 |
| humidifier on the basis of polyaminoamide | 180 | 8.9 |
| acetic acid salt of fatty acid amine complex | 22 | 4.2 |
| water | 275 | |

EXAMPLE 3

The application of a heat expandable material to a web.

A fibrous web consisting of 25 g/m² fibers, of which 50% by weight is polyester 1.7 dtex 40 mm and 50% by weight polyacryl 1.7 dtex 40 mm, and 15 g/m² polyacrylate binder is provided with transversely oriented bands of heat-expandable material. The expansion of the bands takes place mainly in the direction of thickness of the web. The expandable material is produced by mixing a low boiling liquid containing PVDC microspheres with a polyacrylate binder in a ratio of microspheres/binder of 3:1 (calculated as dry material) to which a suitable foam stabilizer, ammonium stearate, has been added. The formulation of this consumption is given below in Table C.

This mixture is frothed up to form a foam volume of 150 g/l and applied to the web in the desired pattern by means of a rotary screen machine. The material applied is 10 to 40 g/m² of dry weight, calculated on the printed surface area.

Drying is effected at a temperature lower than the expansion temperature of the spheres. The transverse bands may be 2 to 10 mm wide with an interspacing ranging from 10 mm to 300 mm.

The potentially expandable material produced in the above way can be used for all sorts of engineering applications in which the incorporation of a fiber reinforcement and/or local swelling during the further manufacturing process is desirable. Possible uses are in the rubber industry, for moldings, building (decorative facings applicable by means of steam), etc.

The use of potentially expandable material may in addition be a means of reducing cost of transportation.

TABLE C

| Stable foam binder with microspheres | | |
|---|---|---|
| | Parts by weight, % | |
| | wet | dry |
| Medium-hardness cross-linkable polyacrylic acid dispersion | 100 | 19.8 |
| Microspheres on the basis of PVDC Copol | 225 | 62.3 |
| Humidifier on the basis of phenol derivative | 4 | 1.3 |
| Foam stabilizer ammonium stearate | 120 | 11.9 |
| Acrylic acid thickener | 40 | 4.7 |
| Water | 900 | |

I claim:

1. A fibrous web provided with microspheres disposed mainly within said web and arranged in a predetermined, non-random pattern in which areas of the web which contain microspheres are separated from each other by areas which contain virtually no microspheres.

2. The web as claimed in claim 1, characterized in that the microspheres are arranged in a regular pattern.

3. The web as claimed in claim 1, characterized in that the areas containing microspheres are substantially similar in shape and are separated from each other by areas containing virtually no microspheres.

4. The web as claimed in claim 1, characterized in that at least 75% of the web is printed with microspheres, preferably 80-95%.

5. The web as claimed in claim 1, characterized in that, after expansion, 10-60% by volume of the web is occupied by the microspheres.

6. A shaped article of manufacture comprising a bonded fibrous web having microspheres therein, said fibrous web having been impregnated with a mixture of a liquid resin and hardener therefore, cured after being shaped, said web containing microspheres mainly within said web such that said microspheres are arranged in a pattern in which areas of said web containing microspheres are separated from each other by areas of said web which contain virtually no microspheres.

7. An article of manufacture according to claim 6, wherein said microspheres are arranged in a regular pattern.

8. An article of manufacture according to claim 7, wherein said areas containing microspheres are substantially similar in shape.

9. An article of manufacture according to claim 6, wherein at least 75% of the surface area of said web is printed with microspheres.

10. An article of manufacture according to claim 6 wherein:

said fibrous web is a non-woven fibrous web comprising polyester fibers, polyacrylic fibers, a combination of polyester and polyacrylic fibers and polyacrylonitrile fibers;

said liquid resin is, a curable resin, a binder selected from the group consisting of lower alkyl acylate polymers, styrene butadiene rubber, acrylonitrile polymers, polyurethane, epoxy resins, polyvinyl chloride, polyvinylidene chloride, copolymers of vinylidene chloride, polyvinyl acitate, partially hydrolized polyvinyl acitate, polyvinyl alcohol, polyvinyl pyrrolidone, and polyester resins;

said microspheres, prior to being expanded, comprise expandable synthetic resin spheres having incorporated therein a blowing agent;

said microspheres, following expansion, having a diameter ranging from 10 $\mu$m-100 $\mu$m;

said microspheres in said fibrous webs are arranged in a honeycomb pattern; and said shaped article manufacture containing from 10 volume percent to 60 volume percent of said expanded microspheres.

11. An article of manufacture according to claim 6, wherein 10-60% by volume of said web is occupied by said expanded microspheres.

12. Bonded non-woven fibrous web comprising synthetic fibers, ceramic fibers, glass fibers or carbon fibers, having microspheres that are mainly within said web, such that said microspheres are arranged in a pattern, in which areas of said web containing microspheres are separated from each other by areas of said web which contain virtually no microspheres, said microspheres, prior to being expanded, comprise expandable synthetic resin spheres having incorporated therein a blowing agent, said microspheres, following expansion, having a diameter ranging from 10 um-100 um.

13. A fibrous web provided with microspheres disposed mainly within said web, arranged in a predetermined, non-random pattern, said microspheres being disposed in areas of greater density of microspheres and areas of lower density of microspheres, said areas of lower density containing substantially no microspheres.

14. A fibrous web according to claim 13 wherein said areas of lower microsphere density contained said fibers.

* * * * *